United States Patent [19]

Albright

[11] 4,013,106
[45] Mar. 22, 1977

[54] FLYWHEEL TREE FELLER AND BUNCHER

[76] Inventor: Alva Z. Albright, 2909 Monroe Hwy., Pineville, La. 71360

[22] Filed: Oct. 17, 1974

[21] Appl. No.: 515,767

[52] U.S. Cl. .............................. 144/34 R; 83/928; 144/3 D; 144/309 AC
[51] Int. Cl.² ...................................... A01G 23/08
[58] Field of Search ............. 144/3 D, 34 R, 34 A, 144/309 AC; 83/928

[56] References Cited

UNITED STATES PATENTS

| | | | |
|---|---|---|---|
| 3,688,816 | 9/1972 | Runeson | 144/309 AC X |
| 3,835,901 | 9/1974 | Jonsson | 144/34 R |
| 3,872,901 | 3/1975 | Bernard | 144/34 R |

*Primary Examiner*—Othell M. Simpson
*Assistant Examiner*—W. D. Bray
*Attorney, Agent, or Firm*—James B. Lake, Jr.

[57] ABSTRACT

A flywheel tree feller is slidably mounted in a base and comprises a combination drive and saw chain peripherally engaging and driving a circular saw bar sprocket in flywheel rotation with no relative rotational motion therebetween. The circular saw bar sprocket is the outer flywheel race of a ball bearing, the inner stationary race of which is supported semi-peripherally to eliminate a center hub and supporting axle thereby cross-cutting for more than the full radius of the flywheel race, rather than a lesser chord, and thus to fell larger trees. A pusher for biasing a cut tree from falling in the direction of the flywheel feller is mounted on the base and also a pair of reaction grapples for loosely closing around a tree to hold the base against reaction displacement by the operating forces of flywheel feller and pusher. A dual bunching assembly is mountable in place of the pusher and comprises upper and lower sets of grapples pivoted for opening and closing and the upper set for additionally for swinging normal to the plane of their opening and closing thereby allowing the dropping of trees without shock to the base and for picking up felled trees. A ball race is mounted on the rear of the buncher assembly with its plane normal to the opening and closing plane of the grapples for tilting the base and buncher assembly sideways for cutting and bunching on a slope. A back platform of the buncher assembly defined a sharp edge for cutting brush and small diameter trees and catching and holding them, and bunching them over the top when the buncher assembly and base is rotated at least more than 90° downward and forward.

6 Claims, 11 Drawing Figures

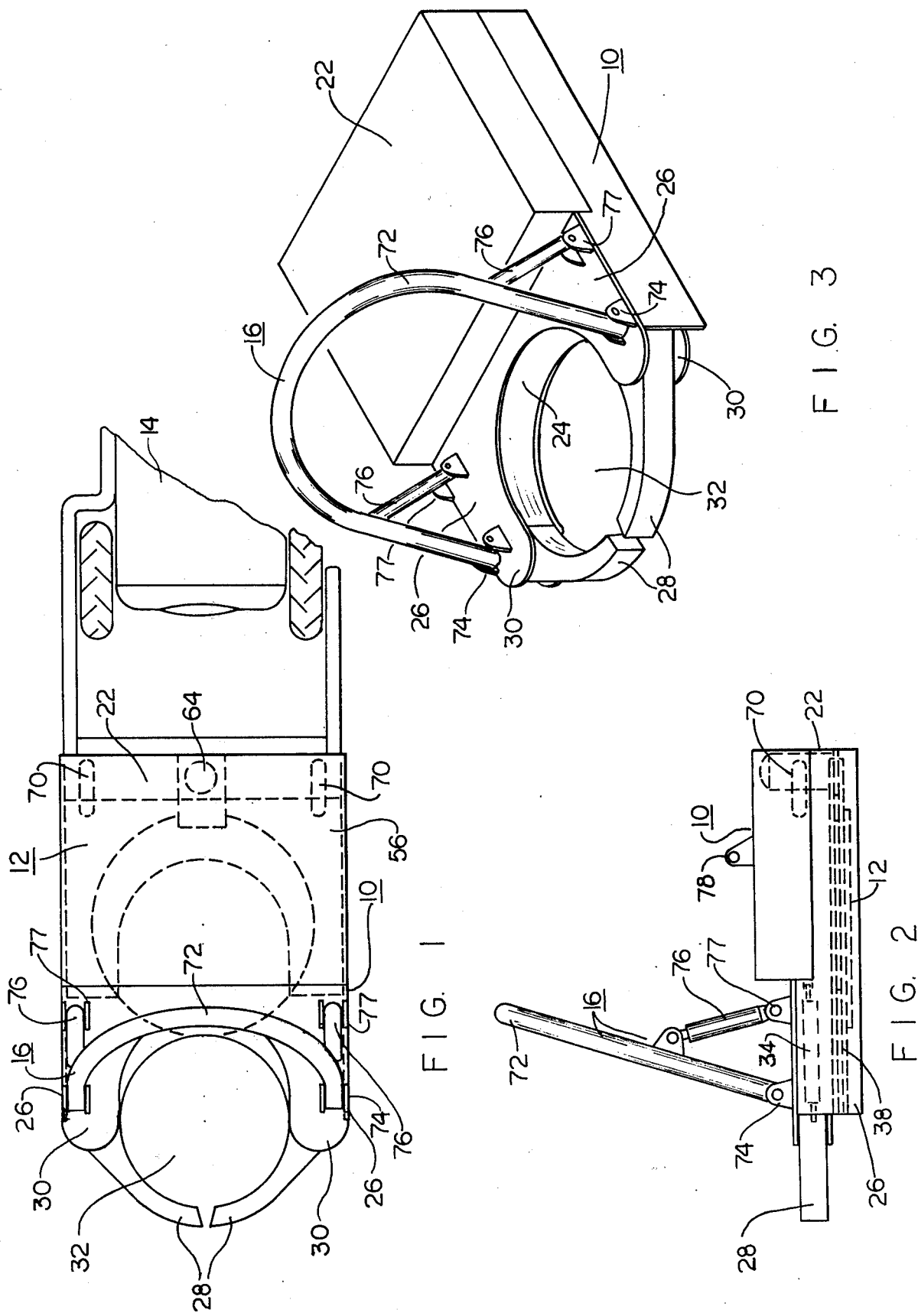

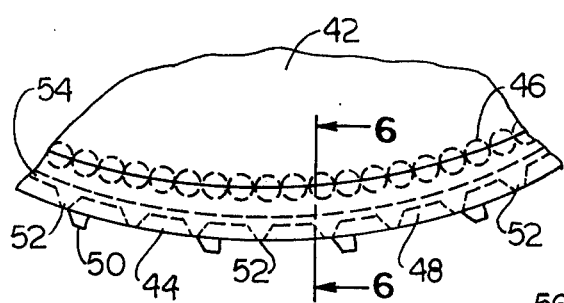
FIG. 5
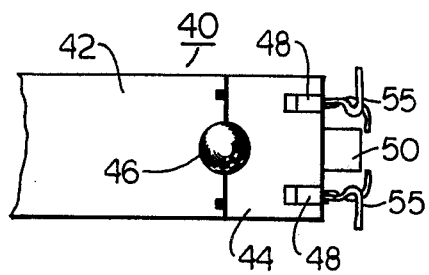
FIG. 6
FIG. 7
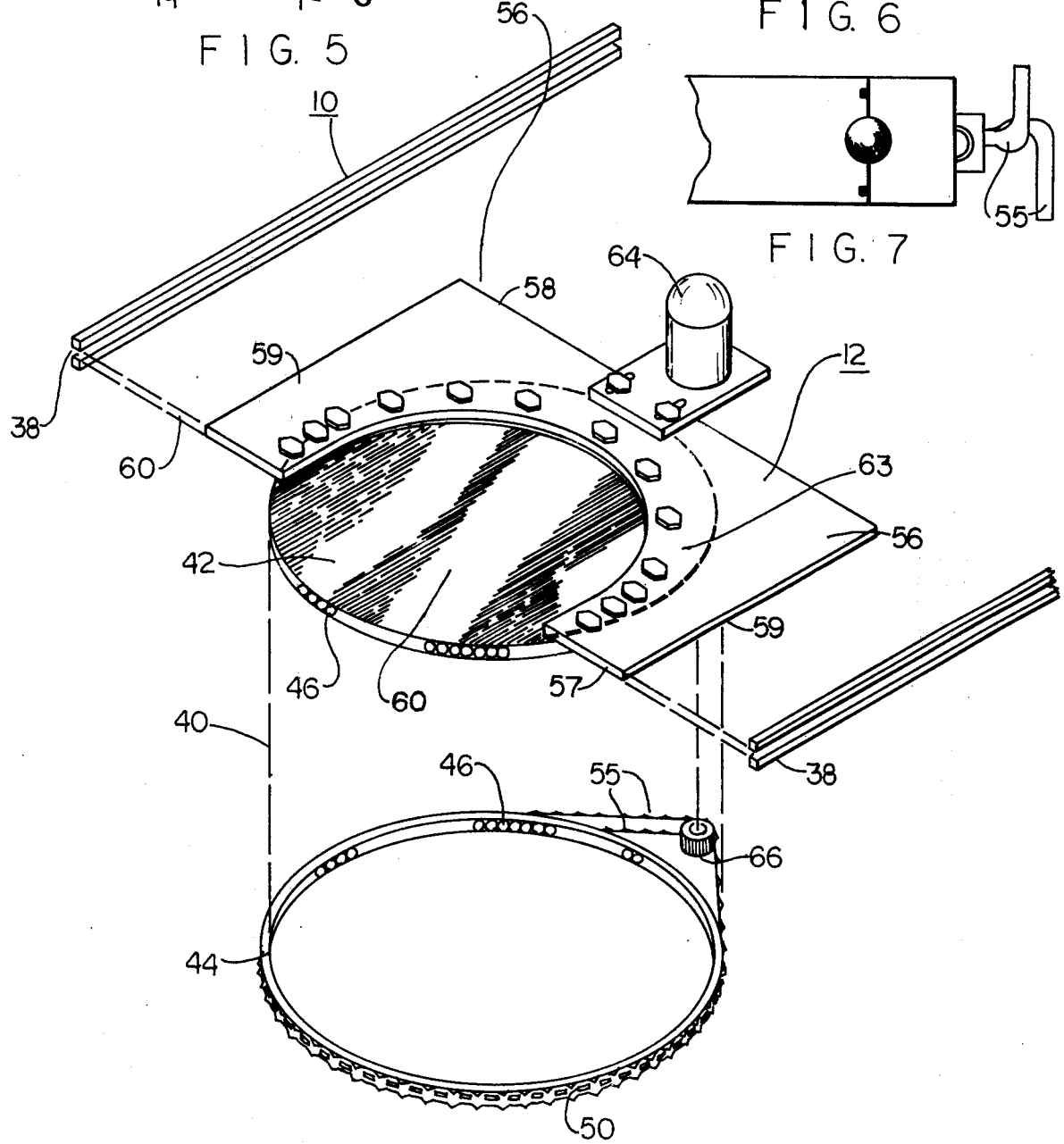
FIG. 4

FLYWHEEL TREE FELLER AND BUNCHER

BACKGROUND OF THE INVENTION

1. Field of the Invention

The invention relates generally to apparatus for harvesting trees, and more particularly to a flywheel tree feller for cutting trees in combination with removable pusher and bunching assemblies.

2. Description of the Prior Art

Heretofore tree fellers employing chain saws have comprised saw bars of various shapes and sizes that are stationary and have a saw chain endlessly rotated therearound in grooves on cutting and back runs with an attendant loss of power caused by the relative movement therebetween and the friction generated thereby.

SUMMARY OF THE INVENTION

An object of the invention is to provide a tree feller having a saw chain rotate a saw bar for adding flywheel momentum to the supplied rotational power and thereby increasing and smoothing out said power.

Another object of the invention is to eliminate sliding friction between saw chain and saw bar and thus increase applied rotational power and also extend the life of those components.

Still another object of the invention is to provide cross-cutting for more than a chord of a circular saw bar and saw chain having a hub mounted thereon for rotation therewith.

A further object of the invention is to provide removable pusher and bunching assemblies for alternative use with the flywheel feller.

BRIEF DESCRIPTION OF THE SEVERAL VIEWS OF THE DRAWINGS

FIG. 1 is a plan view of the invention with pusher assembly,

FIG. 2 is a side view of FIG. 1 without tractor,

FIG. 3 is a three dimensional view of FIGS. 1 and 2,

FIG. 4 is an enlarged exploded view of feller assembly,

FIG. 5 enlarged partial view of flywheel feller races,

FIG. 6 is a sectional view taken along section line 6—6 FIG. 5,

FIG. 7 is same as FIG. 6 showing another specie outer race,

DETAILED DESCRIPTION

Figure 8:
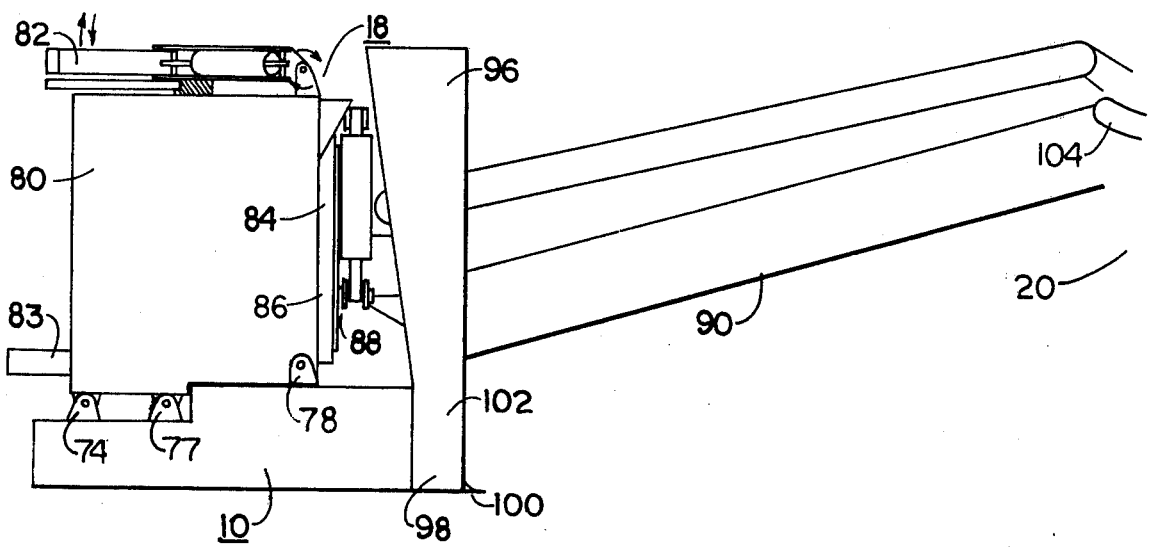
FIG. 8 is a side view of the invention with buncher assembly.
Figure 10:
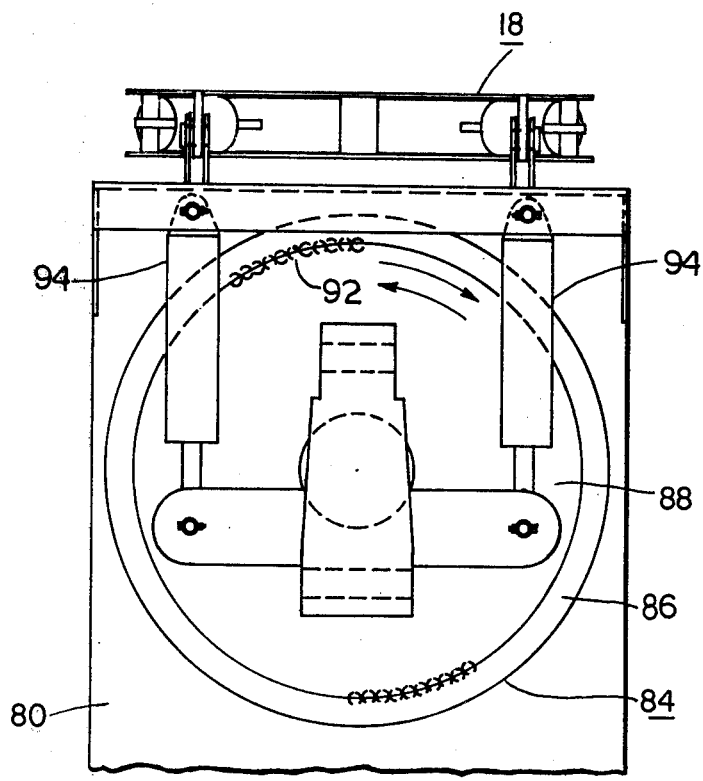
FIGS. 10 and 11 are partial rear and plan views of buncher.
Figure 9:
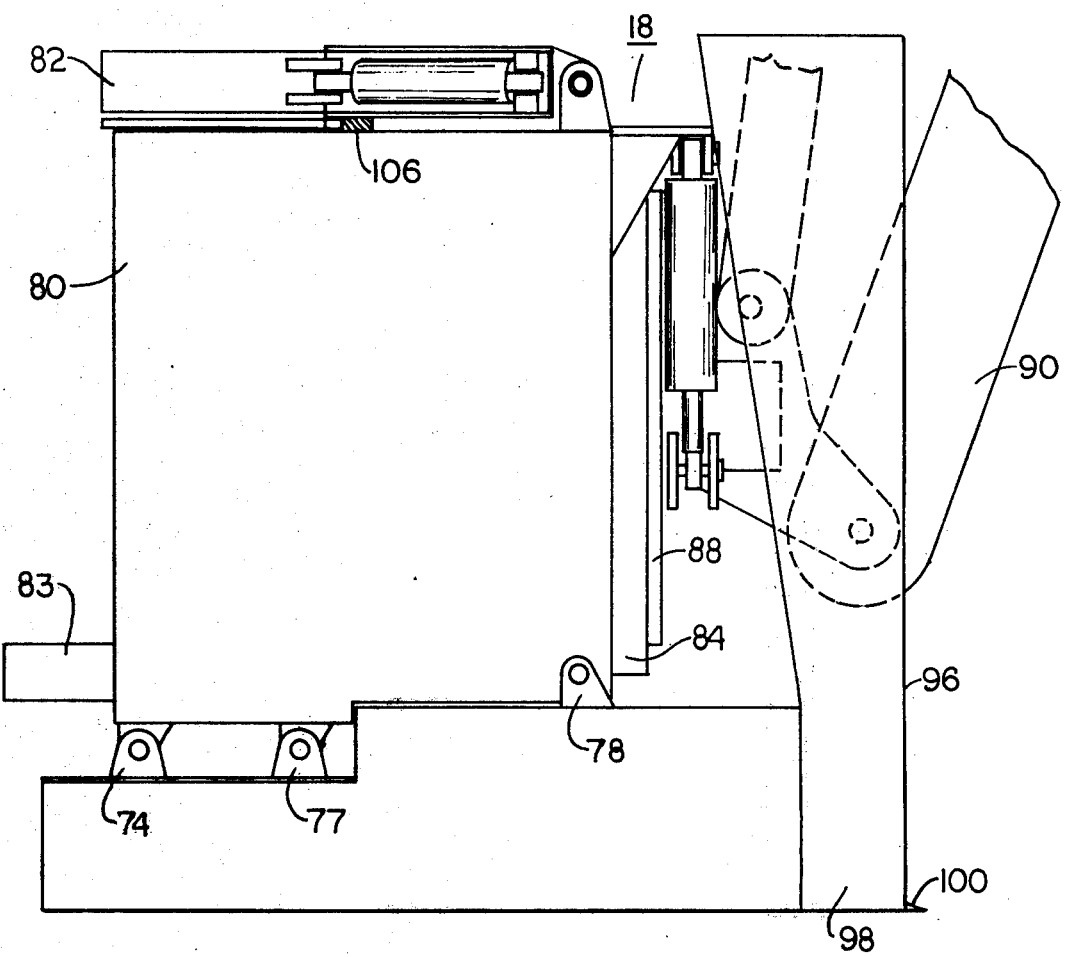
FIG. 9 is an enlarged side view without tractor.
Figure 11:
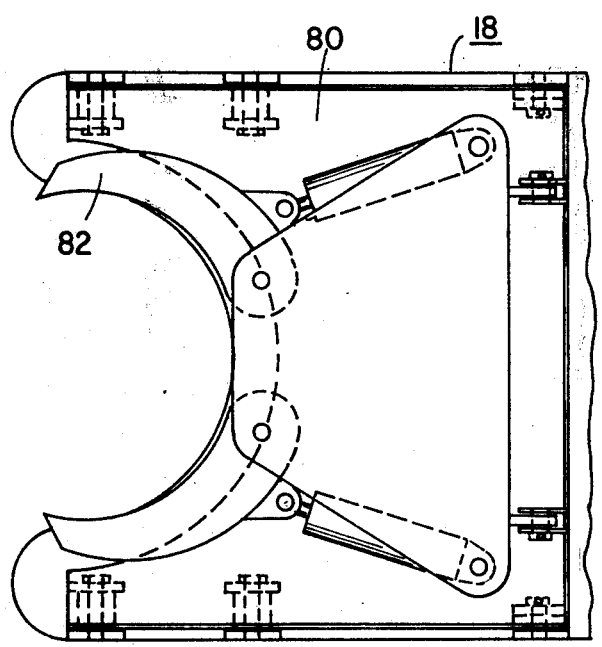

Referring to the drawings, the invention comprises a hollow base 10 in which a flywheel feller assembly 12 is slidably mounted. Base 10 is mounted for use on a pusher type power train 14 as shown in FIG. 1 in combination with a pusher assembly 16. A bunching assembly 18 (see FIGS. 8-10) is mountable on base 10 in place of pusher assembly 16 for fixing the combination of base 10 and bunching assembly 18 on a backhoe type of power train 20 for the additional use of bunching felled trees.

Referring to FIGS. 1-7, hollow base 10 comprises a flat rectangular housing 22 with an open forward end 24 from which two hollow parallel arms 26 extend forwardly spaced transversely apart and defining mutually opposed openings. Grapples 28 are pivotally attached to the ends 30 of arms 26 and are adapted to open and close a space 32 defined between said projecting arms 26 for loosely engaging therein a tree to be felled. Hydraulic cylinders 34 are mounted respectively in arms 26 and are adapted to pivotally open and close grapples 28. Straight parallel slide grooves 38 are interiorly defined on opposing sides of the rectangular housing 22 and arms 26.

Flywheel feller assembly 12 comprises a ball bearing means 40, having an inner stationary race 42 and an outer flywheel race 44, held in concentric rotatable engagement by balls 46 mounted therein. Stationary race 42 is a solid disc and flywheel race 44 is cylindrical and both are mounted concentrically in a common plane. Parallel peripheral slots 48 are defined in the outer cylindrical surface of flywheel race 44 and are spaced axially apart by milling cutters 50 defined therebetween. Teeth 52 are mounted in respective slots 48 and held in place with rivets 54 to make flywheel race 44 a double saw-bar sprocket. Ball bearing means 40 is fixed to a rectangular slide plate 56 having front 57, back 58, and side 59 edges and defining a semi-circular opening 60 centered in said front edge 57, said slide plate 56 being adapted to slidably engage in parallel slide grooves 38 of base 10. Stationary race 42 is bolted in suspension to slide plate 56 to eccentrically overlap the boundaries of opening 60 and is spaced therefrom by crescent shaped space plate 63 conforming to said overlapping part of stationary race 42, thereby permitting axial spacing for drive and saw chains 55, when engaging race 44, to rotate freely with it around race 42 without binding on slide plate 56. An hydraulic motor 64 is fixed to slide plate 56 adjacent back end 58 to rotate a drive sprocket 66 having teeth similar in shape and spacing to teeth 52, and adapted to engage drive and saw chains 55 in endless rotation around drive sprocket 66 and saw bar sprocket or flywheel race 44. Hydraulic cylinders 70 are mounted in housing 22 and are operationally connected to slide slide plate 56 and attached flywheel feller assembly 12 out of forward end 24 of housing 22 to the ends 30 of arms 26 to sever a tree positioned between said arms in space 32 and return into said housing.

Pusher assembly 16 comprises a curved arm 72 pivoted by its ends to mounting studs 74 integral with top of housing 22. Hydraulic cylinders 76 are operably connected to arm 72 to swing it forwardly to engage a tree and bias it away from base 10 and power train 14. Cylinders 76 are secured to studs 77 on base 10.

In use the invention is attached to the front end of a pusher type power train 14, and hydraulic motor 64 and hydraulic cylinders 34, 36, 70 and 76 are connected to hydraulic auxiliary power sources on power train 14. With grapples 28 open, flywheel feller assembly 12 retracted into housing 22, and curved arm 72 swung rearwardly, power train 14 carries the invention to a tree to be felled, engages the three in space 32 between projecting arms 26 and closes grapples 28 therearound by energizing hydraulic cylinders 34. Hydraulic motor 64 is energized to rotate drive, saw chains 55, flywheel race 44 by means of drive sprocket 66. Hydraulic cylinders 70 are energized to slide flywheel feller assembly 12 out of housing 22 to the ends of projecting arms 26 and through space 32 to cut a tree positioned therein. Simultaneously with the energization of cylinders 70 hydraulic cylinder 76 is energized to swing curved arm 72 forward to bias a tree being cut away from the invention and attached power train 14.

Referring to FIGS. 8 – 11, buncher assembly 18 is shown mounted on hollow base 10 and fixed thereto by mounting studs 74, 77 and 78. Buncher assembly 18 comprises an elongated housing 80. Pairs of upper and lower grapples 82 and 83 are pivoted in housing 80 and are adapted to open and close in planes normal thereto. Upper grapples 82 are also pivoted to swing normal to their plane of opening and closing for holding and picking up felled trees at angles with elongated housing 80. Oppositely from grapples 82 on elongated housing 80 a ball bearing 84 has one race 86 fixed to elongated housing 80 and the other race 88 rotatably free to fix to the end of an articulated boom 90 of a backhoe type of power train 20. The races are rotatably connected by balls 92 similar to the flywheel feller races. The plane of ball bearing 84 is normal to that of the opening and closing of both sets of grapples 82 and 83 and is adapted to tilt the buncher assembly and base 10 to engage, cut and bunch trees on a slope. Hydraulic cylinders 94 are operatively connected to race 86 for accomplishing the degree of direction of tilt. An open backed platform 96 having a bottom 98 defining a sharp edge 100 is secured to the back of elongated housing 80. In a backhoe movement of articulated boom 90, sharp edge 100 is used to cut brush and trees of small diameter which are carried by the direction and friction of cutting onto platform bottom 98 to lean against the upper parts of elongated housing 80. Sides 102 prevent the brush and trees from falling sideways off platform 96. A crook 14 is defined adjacent a convenient joint of articulated boom 90 for catching all backward falling trees to push to forward leaning position on the back platform.

An auxiliary power system of backhoe type of power train 20 provides hydraulic power for tilting hydraulic cylinders and for the flywheel feller assembly in the same manner as auxiliary power was provided in the case of the pusher type power train.

In operation with bunching assembly 18, grapples 28 are removed. Lower grapples 83 are similar to grapples 82 in opening and closing. Grapples 83 are first to close around a tree to be cut and first to release said tree after cutting. With base 10 level, grapples 82 and 83 are closed around a tree which is cut by the flywheel cutter as heretofore described with respect to its use with a pusher assembly 16. When said tree is cut, the buncher assembly 18 and base 10 with the tree are lifted and swung by backhoe boom 90 to wherever trees are being piled. Then the buncher assembly 18 and base 10 with the tree are tilted away from power train 20 until the continued fall of the tree away from said power train is assured. Then lower grapples 83 are opened and the tree held only by upper grapples 82 is free to lift off of flywheel assembly 12 as grapples 82 lift off of cushion 106 as tree top strikes the ground. The shock of the tree striking the ground is greatly reduced throughout the harvesting apparatus by the swinging position of grapples 82, and the entire flywheel feller assembly and buncher being suspended in a swinging position from backhoe boom 90. In picking up felled trees, it is swinging grapples 82 (see FIGS. 8 and 10) that are used to reach for them.

The smaller diameter trees cut by sharp edge 100 and stacked on platform bottom 98 are discharged in bunching over the top of elongated housing 80 as it is swung downwardly more than 90 degrees from its cutting position at the end of boom 90.

Referring further to the structure and an additional function of reaction grapples 28, it should be realized that the vertical dimensions thereof as shown in FIG. 3 is such that as a cut tree falls biased by curved arm 72, the butt engages the tops of said grapples 28 and is prevented from engaging and possibly damaging flywheel race 44 and chain saws 55.

I claim:

1. In tree harvesting apparatus, a flywheel tree feller and buncher comprising in combination:
   a. a hollow base with forwardly extending arms defining an open forward end in said base;
   b. a slide plate defining a similar forward opening in size to that in said base, said plate being adapted to slidably engage in said hollow base and between said arms;
   c. a saw bar sprocket means mounted for rotation around an inner stationary race by balls mounted circumferentially therebetween to constitute a ball bearing with races in concentric rotational engagement, said inner race being fixed to said slide plate and eccentric with said slide plate's forward opening for projecting forwardly therebeyond;
   d. combination saw and drive chain means adapted to engage said saw bar sprocket means for driving it in rotation with flywheel momentum to cut a tree when said slide plate slides forwardly for said forward openings in the base and slide plate to coincide;
   e. buncher means fixed to said base to extend vertically thereabove with grapples for engaging and disengaging trees before and after cutting; and
   f. hydraulic power means for operating said slide plate, saw and drive chain means, and said buncher means.

2. A flywheel tree feller and buncher as described in claim 1 wherein said buncher means comprise:
   a. an elongated housing for mounting on said base;
   b. pairs of upper and lower grapples pivoted thereto to open and close parallel with the plane of said arms, and said upper grapples to also pivot normal thereto for cutting and bunching trees on level ground; and
   c. a roller bearing having a race secured to said housing and a race securable to a power train for tilting said housing and buncher means for cutting and bunching trees on a slope.

3. The device as described in claim 2 including:
   a. an open platform fixed to said elongated housing and having a bottom defining a sharp edge for clearing brush and cutting smaller diameter trees that stack in said platform by the direction and friction of backhoe cutting, and having sides for keeping said brush and trees from falling sideways from said platform.

4. A flywheel tree feller as described in claim 1 wherein reaction grapples are pivoted to the ends of said arms and above said circular tree feller means for closing loosely around a tree positioned between said arms to hold said harvesting apparatus in operational position during tree felling.

5. A flywheel tree feller as described in claim 1 wherein a pusher is mounted on said housing for biasing a tree being cut to fall away from said harvesting apparatus.

6. The device as described in claim 4 wherein said grappels extend beyond said circular tree feller means for preventing the peripheral engagement thereof by the butt of a falling tree.

* * * * *